United States Patent [19]
Agrawal

[11] Patent Number: 5,261,116
[45] Date of Patent: Nov. 9, 1993

[54] PROGRAMMABLE, EXPANDABLE CONTROLLER WITH FLEXIBLE I/O

[75] Inventor: Om P. Agrawal, San Jose, Calif.

[73] Assignee: Advanced Micro Devices, Inc., Sunnyvale, Calif.

[21] Appl. No.: 891,603

[22] Filed: Jun. 1, 1992

Related U.S. Application Data

[60] Division of Ser. No. 370,148, Jun. 21, 1989, Pat. No. 5,179,716, which is a continuation of Ser. No. 881,143, Jul. 2, 1986, abandoned.

[51] Int. Cl.⁵ ............................................... G06F 9/22
[52] U.S. Cl. ........................... 395/800; 364/DIG. 1; 364/237.8; 364/238; 364/244.6
[58] Field of Search ............... 395/575, 275, 250, 800, 395/325, 400, 425, 725, 775; 364/DIG. 1, Dig. 2

[56] References Cited
U.S. PATENT DOCUMENTS

| | | | |
|---|---|---|---|
| 3,972,025 | 7/1976 | Taddei | 364/DIG. 1 |
| 4,275,441 | 6/1981 | Takeuchi | 364/DIG. 1 |
| 4,399,505 | 8/1983 | Druke et al. | 364/DIG. 1 |
| 4,438,492 | 3/1984 | Harmon, Jr. et al. | 364/DIG. 1 |
| 4,754,393 | 6/1988 | Kitson et al. | 364/DIG. 1 |

Primary Examiner—Robert B. Harrell
Attorney, Agent, or Firm—Skjerven, Morrill, MacPherson, Franklin & Friel

[57] ABSTRACT

A programmable controller which combines microaddress control logic, memory, a microinstruction decoder, and I/O into a unitary, integrated device. The microaddress control logic is responsive to sequencing signals developed by the microinstruction decoder, and includes an address generator which develops the program address. The memory, which can be either PROM or RAM, is addressed by the address and outputs a microinstruction word to a pipeline register. The microinstruction word has an internal field which is coupled to inputs of the microaddress control logic and the microinstruction decoder, and a control field which is coupled to an output buffer. The output buffer includes multiplexers which permit either the program count or the control field to be multiplexed to the output pins of the device. When the program address is multiplexed to the output pins, the programmable controller can address external memory devices.

9 Claims, 14 Drawing Sheets

PROM EMBODIMENTS

Fig. 10 RAM EMBODIMENTS

STATUS WORD

PROGRAMMABLE, EXPANDABLE CONTROLLER WITH FLEXIBLE I/O

This application is a division of application Ser. No. 07/370,148, filed Jun. 21, 1989, now U.S. Pat. No. 5,179,716, which is a continuation of application Ser. No. 06/881,143, filed Jul. 2, 1986, now abandoned.

CROSS REFERENCE TO RELATED, COPENDING APPLICATION

A related, copending application of particular interest to the instant application is U.S. Ser. No. 684,521, filed Dec. 21, 1984 (now U.S. Pat. No. 4,754,393, issued Jun. 28, 1988) on behalf of Warren K. Miller and Bradford S. Kitson, entitled SINGLE-CHIP PROGRAMMABLE CONTROLLER, and assigned to the assignee of the instant application.

BACKGROUND OF THE INVENTION

1. Field of the Invention

This invention relates generally to digital controllers known variably as sequencers or state machines, and more particularly to single-chip programmable digital controllers.

2. Description of the Related Art

State machines are digital devices which develop predetermined outputs dependent both upon its current "state" and upon its inputs. A typical state machine includes input combinatorial logic, a state register for storing the current state of the machine, and output registered and/or combinatorial logic responsive to the state register. State machines often utilize extensive feedback from the state register and output combinatorial and/or registered logic to the input combinatorial logic to create complex logic states.

Traditionally, state machines were designed using discrete digital gates for the input and output combinatorial logic, and flip-flops (such as D-type flip-flops) for the state registers. As designers created increasingly complex state machines, discrete logic elements were replaced with integrated logic elements such as read only memories (ROMs) and programmable logic arrays (PLAs), and the discrete flip-flops were replaced with integrated digital registers.

State machines are often used as local control units for a subsystem within a larger digital system. By providing a number of microprogrammed control units within a digital system, the demands on the central processing unit (CPU) are reduced with a subsequent increase in system performance. Typical applications for microprogrammed control units are in arithmetic logic units (ALUs), I/O units, interrupt units, diagnostic units, and bus control units.

As mentioned previously, a state machine being used as a microprogrammed control unit includes, at the very least, a state register and some form of digital logic. The simplest of microprogrammable control units uses a ROM which is directly addressed by the output of the state register. The ROM can store a sequence of microinstruction code words, each of which may be divided into a control field and a microinstruction field. The control field can be used to develop outputs to control a unit within a digital system, and the internal microinstruction field can be clocked into the state register to become the ROM address for the next state. ROM based control units are quite primitive, and do not have the capability of conditional branching, subroutine calls, etc.

More advanced microprogrammable controllers have been designed which replace the simple state register with sophisticated address sequencers. Address sequencers can reduce the width of an associated ROM because a short microinstruction code can be used which, when decoded, determines the address of the next microinstruction code.

One such microprogrammable controller, known as the AM2910, is produced in integrated form by Advanced Micro Devices, Inc. of Sunnyvale, Calif. The AM2910 controls the execution sequence of microinstructions stored in an external storage device such as ROM or programmable ROM (PROM). The AM2910 provides a 12 bit address from one of four sources including a microprogram address counter-register, an external input, a loop counter, and a stack register. A 12 bit address bus allows the AM2910 to address a 4K external memory device.

To make digital systems smaller, faster, and less consumptive of energy it is desirable to integrate as many functions as possible into a single, integrated device. Advanced Micro Devices, Inc. produces a single chip fuse programmable controller (FPC) as part number AM29PL141 which allows implementation of complex state machines and controllers by programming an appropriate sequence of microinstructions. The AM29PL141 includes a repertoire of jumps, loops, and subroutine calls which can be conditionally executed based upon test inputs to the device, and provides a designer with powerful control-flow primitives. An on-board PROM can store 64 words of 32 bit wide microprogram memory, and an on-board microprogram address sequencer can execute 29 high level microinstructions.

The AM29PL141 is a great advance over prior art programmable controllers. However, the expansibility of the AM29PL141 is limited and expensive, and its I/O imposes certain design limitations. For example, the AM29PL141 lacks the capability of synchronizing its test and condition code inputs, which requires that the external test conditions need to be synchronized externally so as to remain stable during an entire micro-cycle period. Also, the AM29PL141 lacks the capability of dynamically altering its control outputs, and can only be horizontally cascaded with similar programmable controllers.

Most prior art programmable controllers, including the AM2910 and the AM29PL141 use ROMs or PROMs to store their microinstructions. If, for example, the internal PROM of an AM29PL141 has been programmed, its contents cannot later be changed.

For certain applications, however, it is desirable to implement a programmable controller having memory which can be dynamically altered. This, of course, implies some type of read/write memory such as random access memory (RAM), erasable PROM (EPROM) electrically erasable PROM (EEPROM), or bubble memory. However, the addition of read/write memory to a programmable controller increases the complexity of the I/O to the device. Heretobefore, the complexities involved with implementing a programmable controller with read/write memory have discouraged integrated circuit designers from attempting such a task.

SUMMARY OF THE INVENTION

An object of this invention is to provide an integrated, expandable, programmable controller having flexible I/O.

Another object of this invention is to provide a programmable controller which can be cascaded horizontally without repeating the address sequencer logic in each cascaded device.

An object of an embodiment of the present invention is to provide a programmable controller which further has the capability of dynamically altering the contents of its microprogram memory.

In accordance with these and other objects of this invention, a programmable controller is provided which includes microaddress control logic including a program counter, memory including a plurality of microinstruction word storage locations, a microinstruction decoder responsive to an internal microinstruction field of the microinstruction word, and an output buffer including an output multiplexer responsive to control field of the microinstruction word and to a microaddress produced by the program counter and operative to develop external control signal therefrom.

The microinstruction words are divided into two fields, namely the internal field and the control field. The control field is user-defined and typically provides a sequence of control codes for controlling various units within a digital system. The internal field includes an OPCODE subfield as well as internal, immediate DATA/MASKING subfields. The OPCODE subfield is an input to the microinstruction decoder which develops control signals for the microaddress control logic.

In addition to the program counter, the microaddress control logic includes a loop counter, a subroutine stack, branch control logic, a mask register, and a constant register. The loop counter, as was the case with the program counter, has an output bus coupled to the output buffer. The input buffers to the device can be user-defined as transparent or registered to provide the capability of having either asynchronous or synchronous test inputs to the device.

The microprogram memory of a preferred embodiment of the present invention can store 128 words of 34-bit-wide microprogram memory. A pipeline register is provided so that a new microinstruction can be fetched while a current microinstruction is being executed.

In some embodiments of the present invention, the microprogram memory includes PROM storage and in other embodiments of the present invention, the microprogram memory includes RAM storage. In the embodiments with RAM storage, means are provided for dynamically altering the contents of the RAM storage.

An advantage of the programmable controller of the present invention is that it can be easily cascaded horizontally by outputting the contents of the program counter register through the output buffer and to external memory devices. In consequence, the present programmable controller can develop any number of control signals for a digital unit without repeating the expensive sequencer circuitry.

Another advantage of this invention is that it has very flexible I/O. The input buffers permit either asynchronous or synchronous test and condition code inputs, and the output buffer permits the dynamic, multiplexed output of contents of the control field, the program counter, and the loop counter.

Advantages of the microaddress control logic portion of the present invention include the capability of flexible masking operations due to the masking and constant storage registers, and the provision of an independent, true subroutine stack for efficient subroutine nesting.

Other objects, features and advantages of the present invention will become apparent upon consideration of the following detailed description and the accompanying drawings, in which like reference designations represent like features throughout the figures.

DETAILED DESCRIPTION OF THE INVENTION

Reference is made now in detail to specific embodiments of the present invention, which illustrate the best modes presently contemplated by the inventor for practicing the invention.

Figure 1:
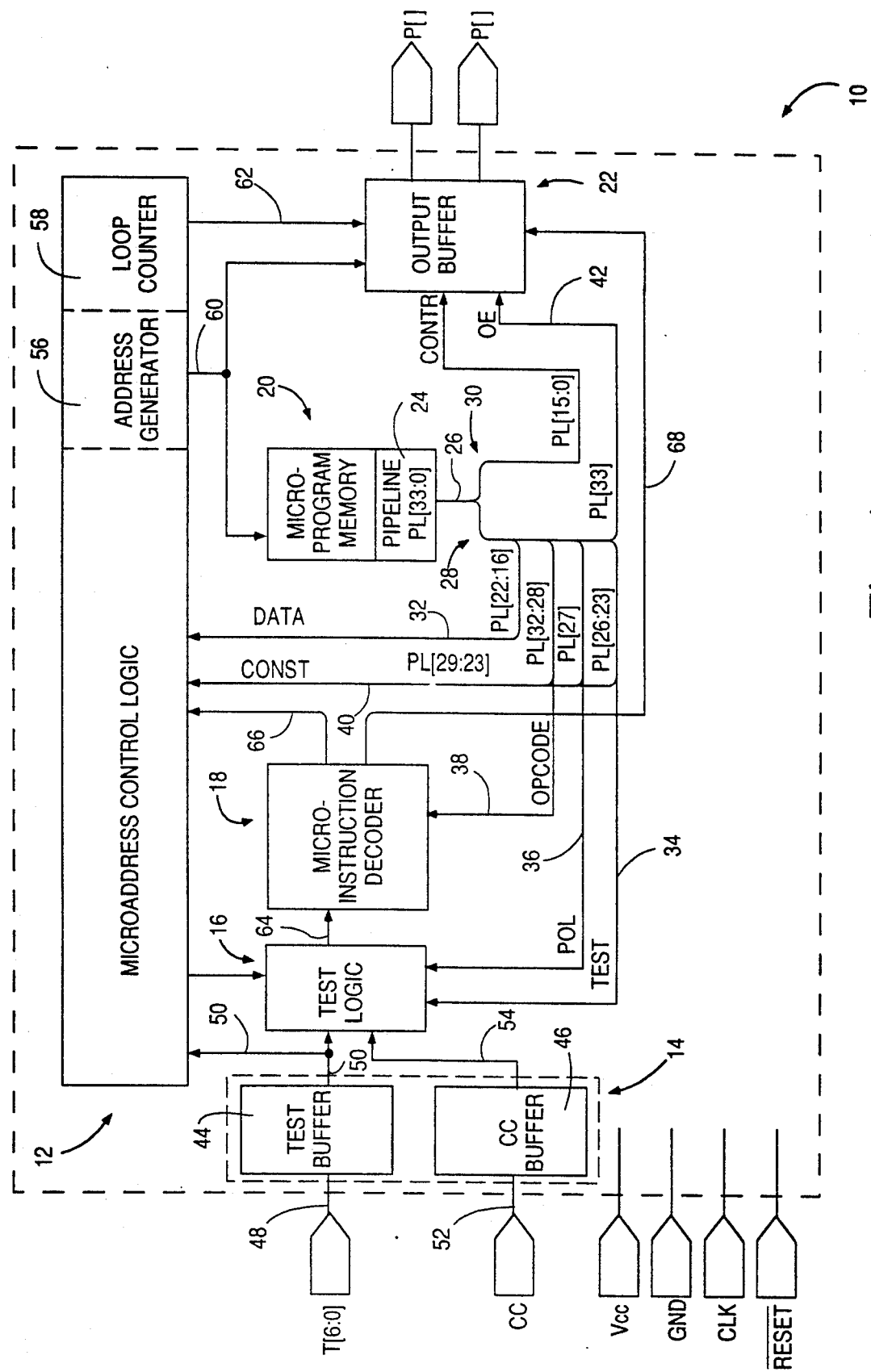
FIG. 1 is a block diagram of a programmable controller in accordance with the present invention.

Referring to FIG. 1, a programmable controller 10 in accordance with the present invention includes microaddress control logic 12, an input buffer 14, test logic 16, a microinstruction decoder 18, a microprogram memory 20, and an output buffer 22. The microprogram memory 20 has pipeline register circuitry 24 which develops an output on a thirty-four-bit-wide pipeline bus 26. The pipeline bus 26 includes an internal bus 28 which is eighteen bits wide, and a control bus 30 which is sixteen-bit-wide.

The internal microinstruction bus 28 includes a DATA bus 32, a TEST bus 34, a polarity (POL) bus 36, an operational code (OPCODE) bus 38, a constant bus (CONST) 40, and an output enable line 42 (OE). DATA bus 32, which includes lines PL[22:16] is connected to an input of microaddress control logic 12, as is CONST bus 40, which includes lines PL[29:23]. TEST bus 34, which includes lines PL[26:23] and POL line 36 (PL[27]) are coupled to inputs of TEST logic 16. OPCODE bus 38, which includes lines PL[32:28] is coupled to inputs of microinstruction decoder 18, and output enable (OE) line 42 (PL[33]) is coupled to an input of the output buffer 22. Control bus 30 is also coupled to inputs of output buffer 22.

Input buffer 14 includes a test buffer 44 and a condition code buffer 46. The input of test buffer 44 is coupled to a test input bus 48 which is, in turn, coupled to test input pins T[6:0], and the output of test buffer 44 is coupled to test logic 16 by a test output bus 50. Similarly, the input of CC buffer 46 is coupled by a line 52 to a CC input pin, and the output of CC buffer 46 is coupled to test logic 16 by a line 54.

Microaddress control logic 12 includes an address generator 56 and a loop counter 58. Address generator 56 has an output on an address generator bus 60 which is coupled to both the microprogram memory 20 and output buffer 22. Loop counter 58 has an output coupled to a counter bus 62 which is, in turn, coupled to an input of output buffer 22.

In addition to having inputs coupled to OPCODE bus 38, microinstruction decoder 18 has inputs coupled to a test logic bus 64 developed by test logic 16. Microinstruction decoder 18 produces outputs on a sequencing bus 66 which is coupled to an input of microaddress control logic 12, and a multiplexer control line 68 which is coupled to an input of output buffer 22.

Programmable controller 10 also includes inputs for power ($V_{cc}$), ground (GND), a system clock (CLK), and a reset (RESET). The $V_{cc}$, GND, CLK, and RESET inputs are coupled to all major sections of programmable controller 10 and the actual interconnections will not be shown herein.

Figure 2:
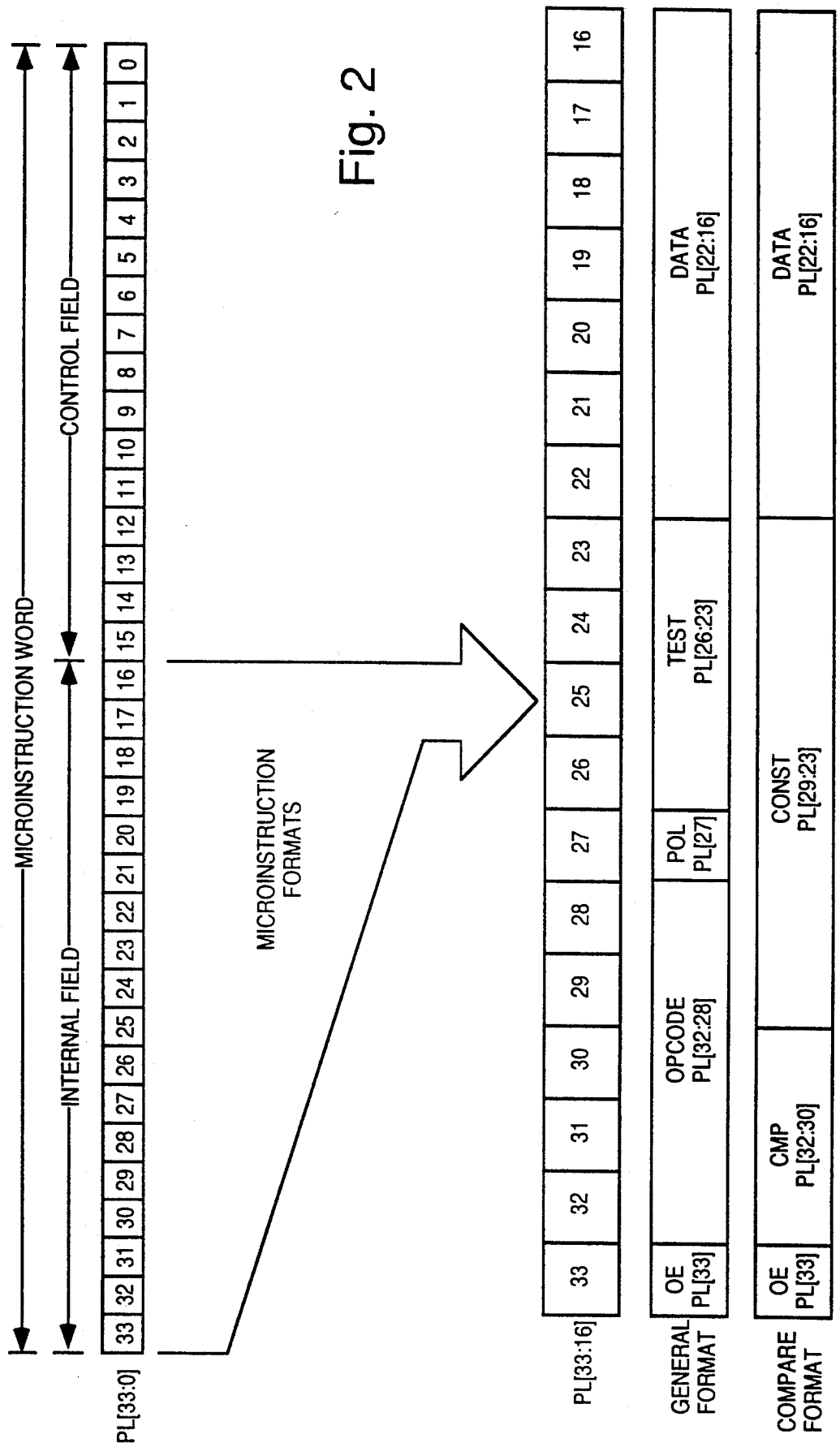
FIG. 2 illustrates the fields and subfields of the microinstruction words.

Referring now to the upper part of FIG. 2, the microinstruction words stored within microprogram memory are preferably thirty-four bits in width. The lowest sixteen bits, (bits 0-15) comprise the control field portion of the microinstruction word, and the uppermost eighteen bits (bits 16-33) comprise the internal field portion of the microinstruction word.

Referring now to the lower part of FIG. 2, the internal field preferably has two basic formats, namely a "general" format and a "compare" format. The general format includes a one bit output enable (OE) subfield, a five bit operational code (OPCODE) subfield, a one bit polarity (POL) subfield, a four bit test (TEST) subfield, and a seven bit data (DATA) subfield. When in the general format, the OE subfield is developed on PL[33], the OPCODE subfield is developed on PL[32:28], the POL subfield is developed on PL[27], the TEST subfield is developed on PL[26:23], and the DATA subfield is developed on PL[22:16].

The compare format includes a one bit output enable (OE) subfield, a three bit compare (CMP) subfield, a seven bit constant (CONST) subfield, and a seven bit data (DATA) subfield. When in the compare format the OE subfield is developed on PL[33], the CMP subfield is developed on PL[32:30], the CONST subfield is developed on PL[29:23], and the DATA subfield is developed on PL[22:16].

Figure 3A:
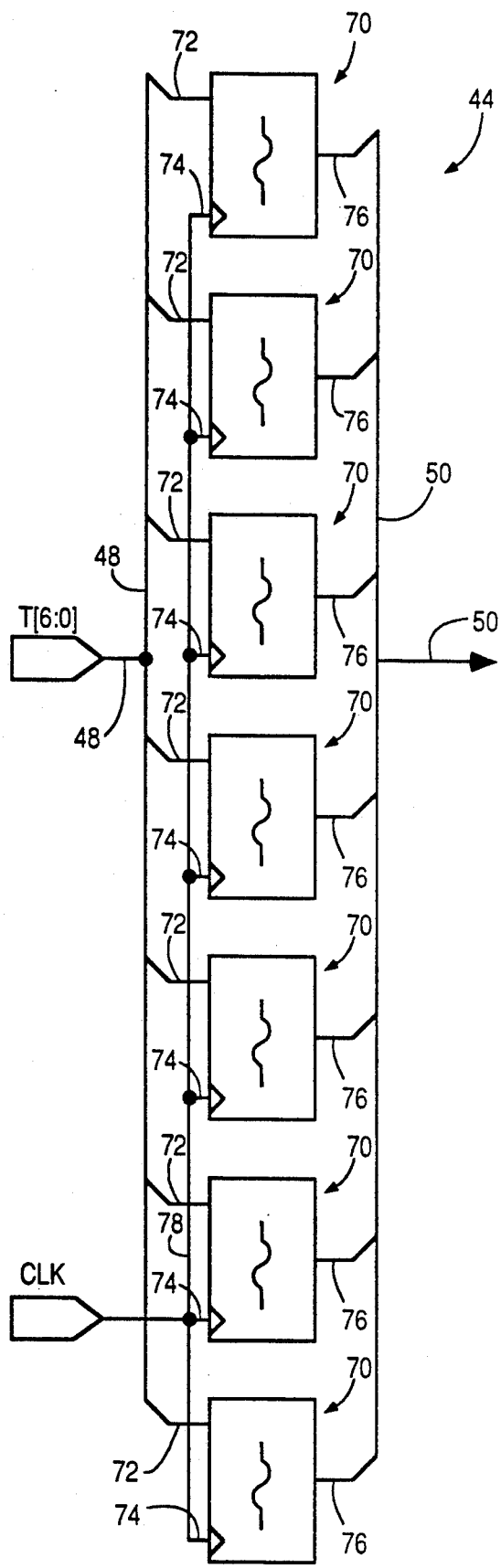
FIGS. 3a, 3b, and 3c illustrate the input buffer of FIG. 1.

Referring now to FIG. 3a, test buffer 44 includes a number of fuse programmable registers 70, each having a data input 72, a clock input 74, and a data output 76. The data inputs 72 are coupled to test input bus 48, and the data output 76 are coupled to test output bus 50. The clock inputs 74 are coupled to the system clock CLK by a line 78.

Figure 3B:
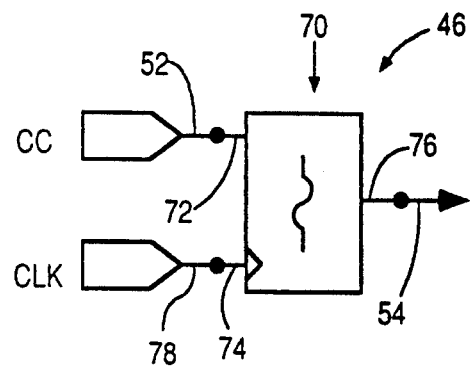

Referring to FIG. 3b, condition code buffer 46 includes a programmable register 70 having a data input 72, a clock input 74, and a data output 76. The data input 72 is coupled to line 58, the clock input 74 is coupled to the system clock CLK by a line 78, and the data output 76 is coupled to line 54.

Figure 3C:
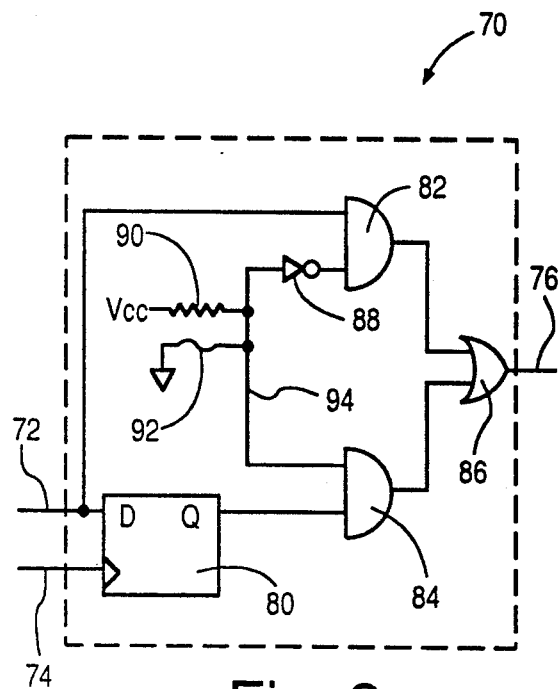

In FIG. 3c, a schematic for one embodiment of a programmable register 70 is shown. This embodiment includes a D-type flip-flop 80, two AND gates 82 and 84, an OR gate 86, an inverter 88, a current limiting resistor 90, and a programming fuse 92. The D input of flip-flop 80 is coupled to line 72, and the clock input of flip-flop 80 is coupled to the clock line 74. The output of OR gate 86 is coupled to line 76.

One input of AND gate 82 is coupled to data input line 72, and its other input is coupled to the output of inverter 88. The input of inverter 88 is coupled to one of the inputs of AND gate 84 by a line 94, and the other input of AND gate 84 is coupled to the Q output of flip-flop 80. Line 94 is coupled to $V_{cc}$ by resistor 90, and to ground by fuse 92. The outputs of AND gates 82 and 84 are coupled to the inputs of OR gate 86.

Fuse 92 can be left intact, or "blown" with programming techniques well known to those skilled in the art. If fuse 92 is left intact, line 94 will be at a logical LO level, which forces the output of AND gate 84 to a logical LO level. Signals developed on data input lines 72 will pass through AND gate 82 and OR gate 86 to data output line 76. Thus, with fuse 92 intact programmable register 70 is "transparent", and the data signals on line 76 are substantially identical to the data signals on line 72. If, on the other hand, fuse 92 is caused to be blown by a user, line 94 will be pulled HI due to its connection to $V_{cc}$ through register 90, causing the output of AND gate 82 to go LO. Signals developed at the Q output of flip-flop 80 pass through AND gate 84, OR gate 86, and are developed on line 76. In consequence, when fuse 92 is blown, the signals on data line 76 are synchronized with the system clock signals CLK.

Since each of the programmable registers 70 can be independently programmed, it is possible to have some of the inputs registered and some of the inputs transparent. This capability permits very flexible input programming for the device.

Figure 4:
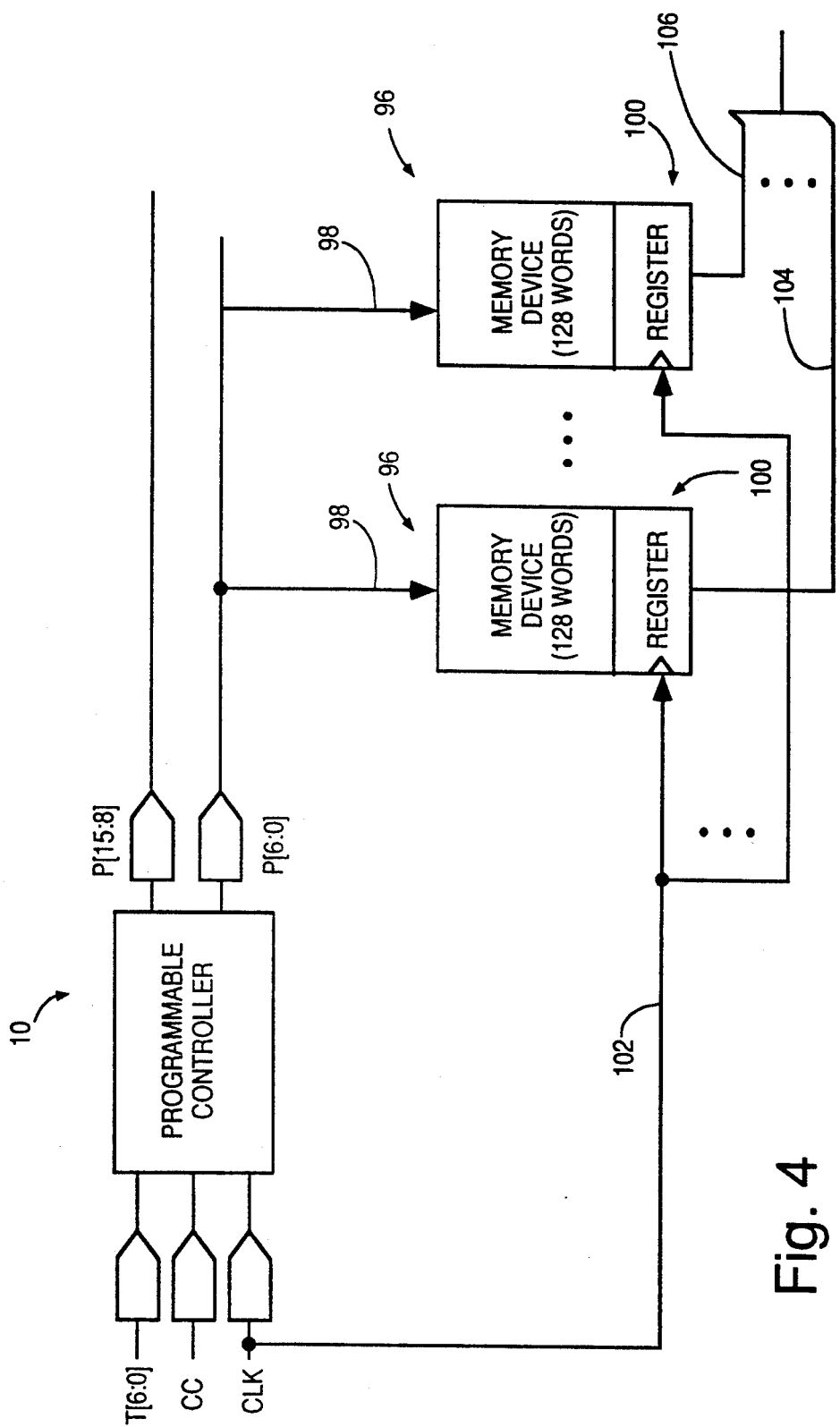
FIG. 4 is block diagram of the interconnection of a programmable controller with external memory devices.

In FIG. 4, the programmable controller 10 is shown in its expansion mode. In this mode, the output buffer 22 is user programmed to cause the contents of address generator 56 to be developed on pins P[6:0]. The remaining pins, namely P[15:7], are coupled either to part of the pipeline bus 26 or to loop counter 58.

When in an expansion mode one or more memory devices 96 have inputs coupled to address bus 98 which is derived from pins P[6:0] of programmable controller 10. In the present embodiment, the memory devices 96 are limited to 128 words of addressable memory. However, there is no theoretical limit to the width of an individual memory device 96, nor to the number of memory devices 96 that, can be coupled in parallel to bus 98. Consequently, one programmable controller 10 in accordance with the present invention can control memory devices to provide virtually any number of control outputs. Furthermore, it should be noted that the address sequencing circuitry of programmable controller 10 does not have to be repeated with each individual memory device.

Preferably, each memory device 96 is associated with an output register 100 responsive to the system clock CLK on a line 102 and having outputs on buses such as buses 104 and 106. Buses 104, 106, etc. can be coupled together into a master control bus 108.

Registers 100 are used to ensure that the signals on master control bus 108 are synchronized with the signals on pipeline bus PL[33:0] within programmable controller 10. Memory devices 96 can be of virtually any type including ROMs, PROMs, RAMs, etc.

PROM EMBODIMENTS

PROM Pin Descriptions

Figure 5:
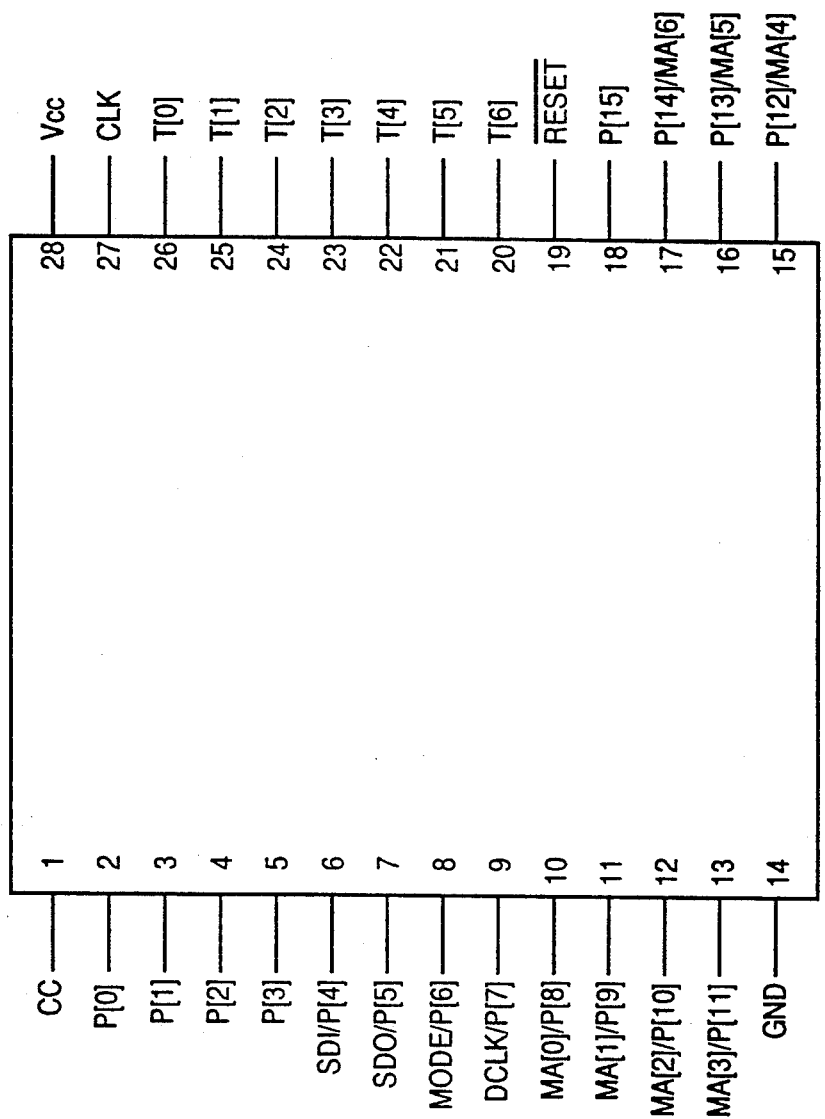
FIG. 5 is pin diagram for the PROM embodiments of the present invention.

Referring now to FIG. 5, the pin descriptions for the PROM embodiments are as follows:

| Pin Number | Pin Mnemonic | Description |
|---|---|---|
| 1 | CC | External condition (CC) test input. The CC input can be fused programmed as registered or transparent. |
| 2-8 | P[0:6] | The lower, general purpose microprogrammable control outputs. Outputs P [6:0] are permanently enabled |
| 6 | SDI | Serial data input when in a serial shadow register (SSR) diagnostics mode. |
| 7 | SDO | Serial data output when in a serial shadow register (SSR) diagnostics mode |
| 8 | MODE | Diagnostic control mode input when in a serial shadow register (SSR) diagnostics mode. |
| 9 | DCLK | Diagnostic clock input when in the serial shadow register (SSR) mode. |
| 9 | P[7] | A microprogram address output. |
| 10-13 15-18 | P[8:15] | Upper, general purpose microprogrammed control outputs which can be dynamically enabled or disabled. When disabled, the P[15:8] outputs are tri-stated. Also, the contents of the internal loop counter can be routed to the control outputs P[14:8] under microinstruction control, permitting dynamic modification of output control signals |
| 10-13 15-17 | MA[0:6] | Microprogram address outputs from the internal program counter. A controller expansible option fuse (EXP) can be programmed to set pins 10-13 and 15-17 to output the microprogram address for external memory devices. |
| 14 | GND | Ground. |
| 19 | RESET | Reset input. A reset forces all bits of the address generator to "1". |
| 20-26 | T[6:0] | External test inputs. With conditional microinstructions these inputs are selected according to a four bit TEST subfield. The inputs T[6:0] can also be used either as a branch address or as a count value depending upon the microinstruction. The inputs T[6:0] can be fuse programmed as registered or as transparent. |
| 27 | CLK | System clock input. The rising edge of the clock is used to trigger internal registers. |
| 28 | $V_{cc}$ | Power input. |

PROM Circuitry

Figure 6:
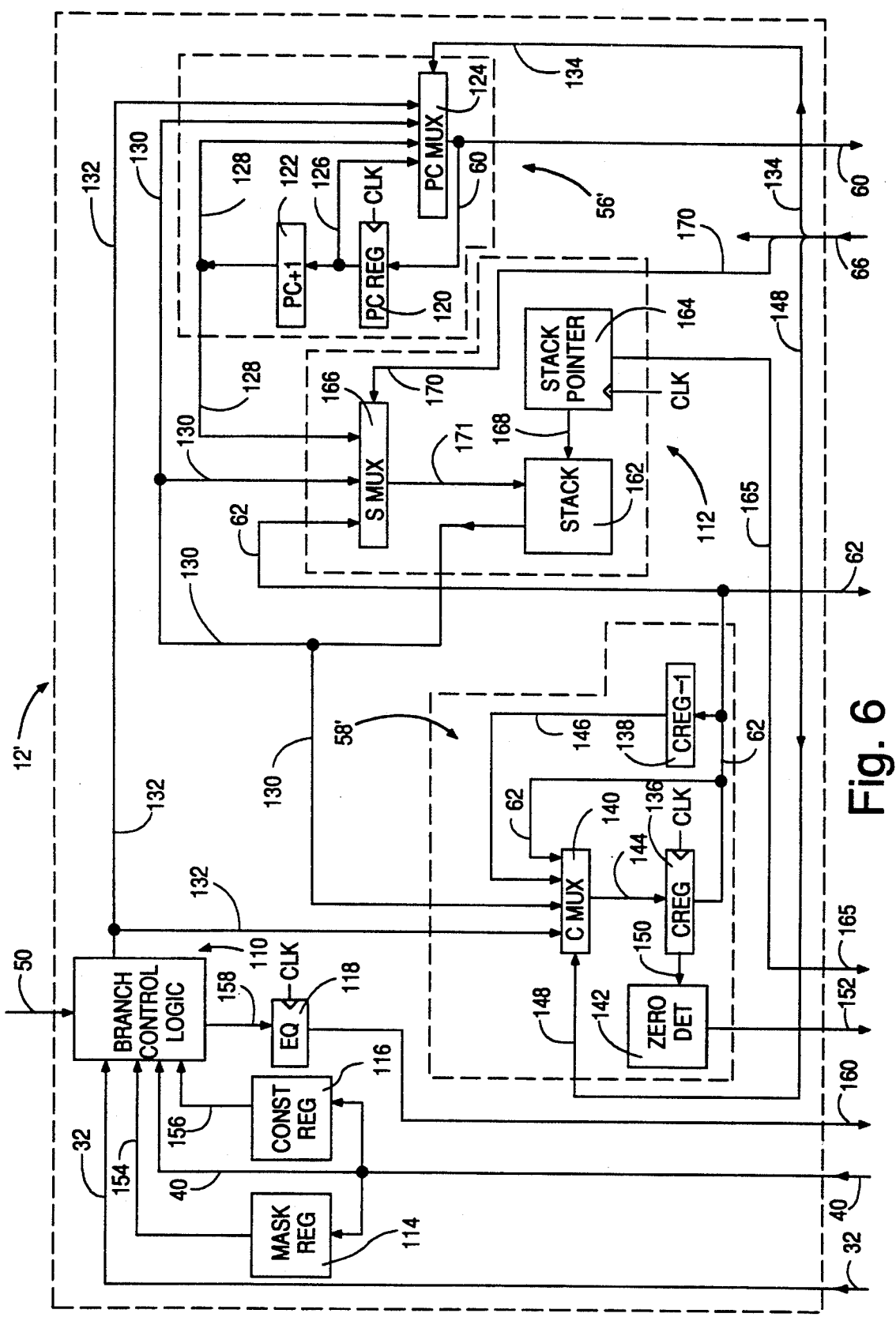
FIG. 6 is a block diagram of the microaddress control logic for the PROM embodiments.

Referring to FIG. 6, a microaddress control logic circuit 12' includes an address generator 56', a loop counter 58', branch control logic 110, and a subroutine stack circuit 112. The microaddress control logic 12' also preferably includes a mask register 114, a constant register 116, and an equality flip-flop 118.

Address generator 56' includes a program counter (PC) register 120, an incrementer 122, and a program counter multiplexer (PCMUX) 124. PC register 120 is preferably a seven-bit-wide D-type register, and is clocked by the system clock CLK. PC register 120 has an output on a bus 126 which is coupled to inputs of both incrementer 122 and PC MUX 124. PC register has an input coupled to address generator bus 60.

Incrementer 122 has an input coupled to bus 126, and has an output on a bus 128. Bus 128 is input to PC MUX 124, and to subroutine stack circuitry 112.

PCMUX 124 is a seven-bit-wide, 4-to-1 multiplexer having inputs coupled to bus 126, bus 128, a bus 130 from subroutine stack circuitry 112, and a bus 132 from branch control logic 110. PCMUX 124 is controlled by PCMUX control bus 134, and develops its output on address generator bus 60.

Loop counter 58' includes a counter register (CREG) 136, a decrementer 138, a counter multiplexer (CMUX) 140, and a zero detector 142. CREG 136 is a seven-bit-wide D-type register responsive to an input bus 144 from CMUX 140, and developing an output on counter bus 62. CREG 136 is clocked by system clock CLK.

Decrementer 138 has, as an input, counter bus 62, and outputs a decremented count on a bus 146. CMUX 140 is a seven-bit-wide, 4-to-1 multiplexer having, as inputs, bus 132 from the branch control logic 110, bus 130 from subroutine stack circuitry 112, bus 146 from decrementer 138, and bus 62 from CREG 136. CMUX 140 is responsive to a CMUX control bus 148 and, as mentioned previously, has an output on bus 144. Zero detector 142 is responsive to the count within CREG 136 via a line 150 and develops a zero detect output on a line 152 when the count within CREG 136 is "0000000".

Branch control logic 110 has, as inputs, data bus 32 and constant bus 40. Branch control logic is also responsive to a bus 154 from mask register 114, and a bus 156 from a constant register 116. Branch control logic 110 develops an output on branch control logic bus 132 and upon a line 158. The equality flip-flop 118 is clocked by a system clock CLK, and develops a registered equality signal on a line 160.

Subroutine stack circuitry 112 includes a subroutine stack 162, a stack pointer 164, and a stack multiplexer (SMUX) 166. The stack 162 is preferably seven bits wide and four words deep. The stack 162 is addressed by stack pointer 164 via an address bus 168, and develops an output on stack bus 130.

SMUX 166 is a seven-bit-wide, 3-to-1 multiplexer, having, as inputs, counter bus 62, stack bus 130, and bus 128. SMUX 166 is responsive to a control bus 170 and develops an output on a bus 171 which can provide a data input for stack 162. Stack pointer 164 is responsive to the system clock CLK, and is further operative to develop a "stack-full" signal on a line 165.

Figure 7:
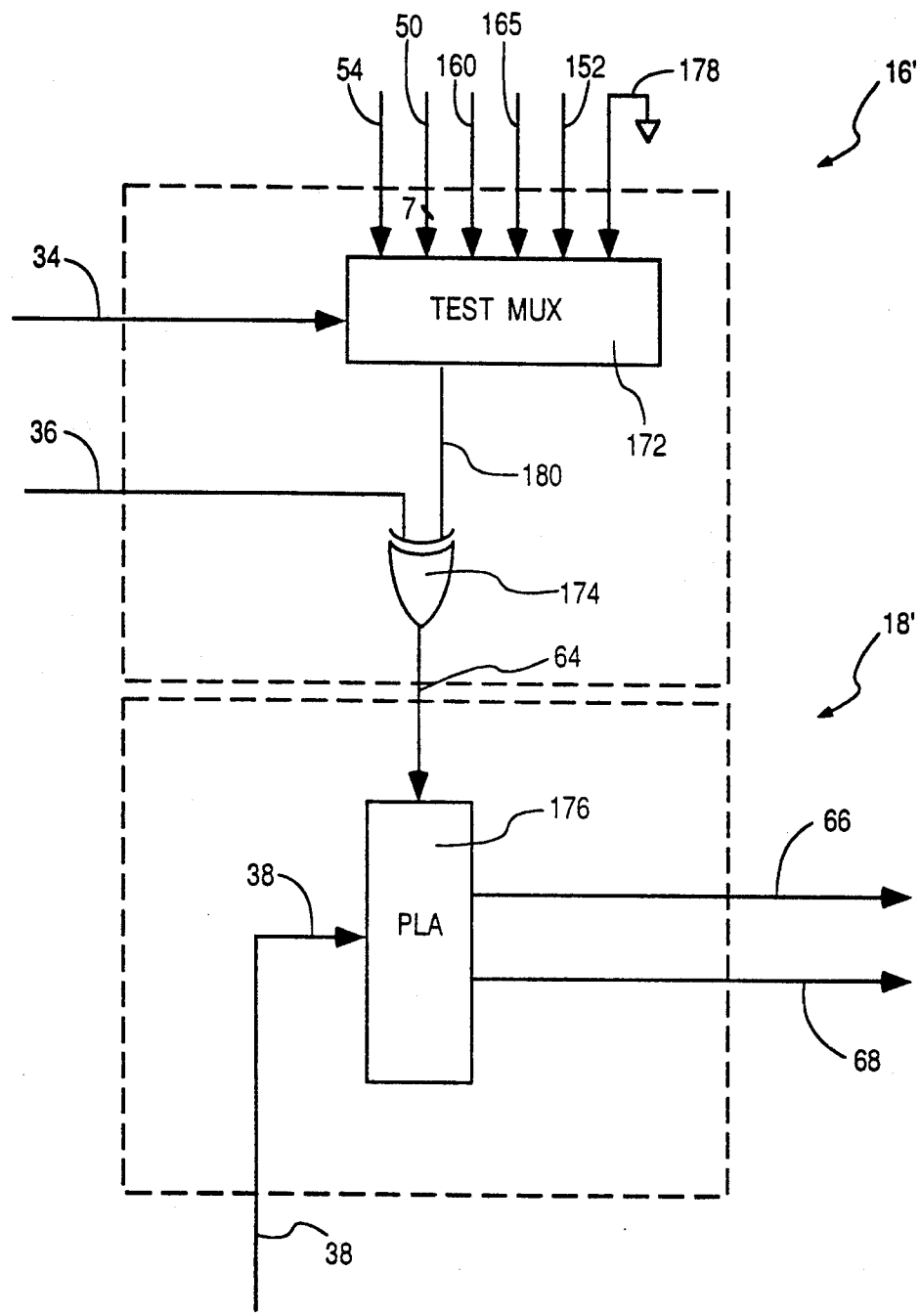
FIG. 7 is a block diagram of the test logic and microinstruction decoder of the PROM embodiments.

Referring now to FIG. 7, a preferred embodiment for a test logic circuit 16' and a microinstruction decoder circuit 18' is shown. More specifically, test logic 16' includes a test multiplexer (TEST MUX) 172 and an exclusive OR (XOR) gate 174, and microinstruction decoder 18' includes a programmable logic array (PLA) 176.

TEST MUX 172 is a one-bit-wide, 16-to-1 multiplexer having inputs of line 54, bus 50, line 160, line 165, line 152, and a line 178. TEST MUX 172 is controlled by test bus 34 and is operative to develop an output on line 180. Line 178 is grounded to permit a logical "0" to be input to TEST MUX 172 for unconditional jumps. TEST MUX 172 selects among its various inputs in the following manner.

| TEST (P[26:23]) | condition under test |
|---|---|
| 0000 | T[0] |
| 0001 | T[1] |
| 0010 | T[2] |
| 0011 | T[3] |
| 0100 | T[4] |
| 0101 | T[5] |
| 0110 | T[6] |
| 0111 | CC |
| 1000 | EQ |
| 1001 | FULL (stack) |
| 1010 | ZERO |
| 1011 –1110 | (reserved) |
| 1111 | unconditional mode |

XOR gate 174 has one input coupled to line 180, and another input coupled to polarity line 36. When polarity line 36 is a logical HI, the output of XOR gate on a line 182 is an inverse of the signal developed on line 180 by TEST MUX 172. When the polarity signal on line 36 is LO, the output of XOR gate 174 on line 182 is of the same polarity as the signal on line 180. Therefore, the polarity signal on line 36 permits either a normal or an inverse logic state to be input to PLA 176 from TEST MUX 172.

PLA 176, in addition to being responsive to the signal on test logic line 64, is further responsive to the OP-CODE signals on OPCODE bus 38. PLA 176 develops, at its outputs, a sequence of control signals on a sequencing bus 66 for microaddress control logic 12, as well as multiplexer control signals on multiplexer control line 68 for the output buffer 22.

Figure 8:
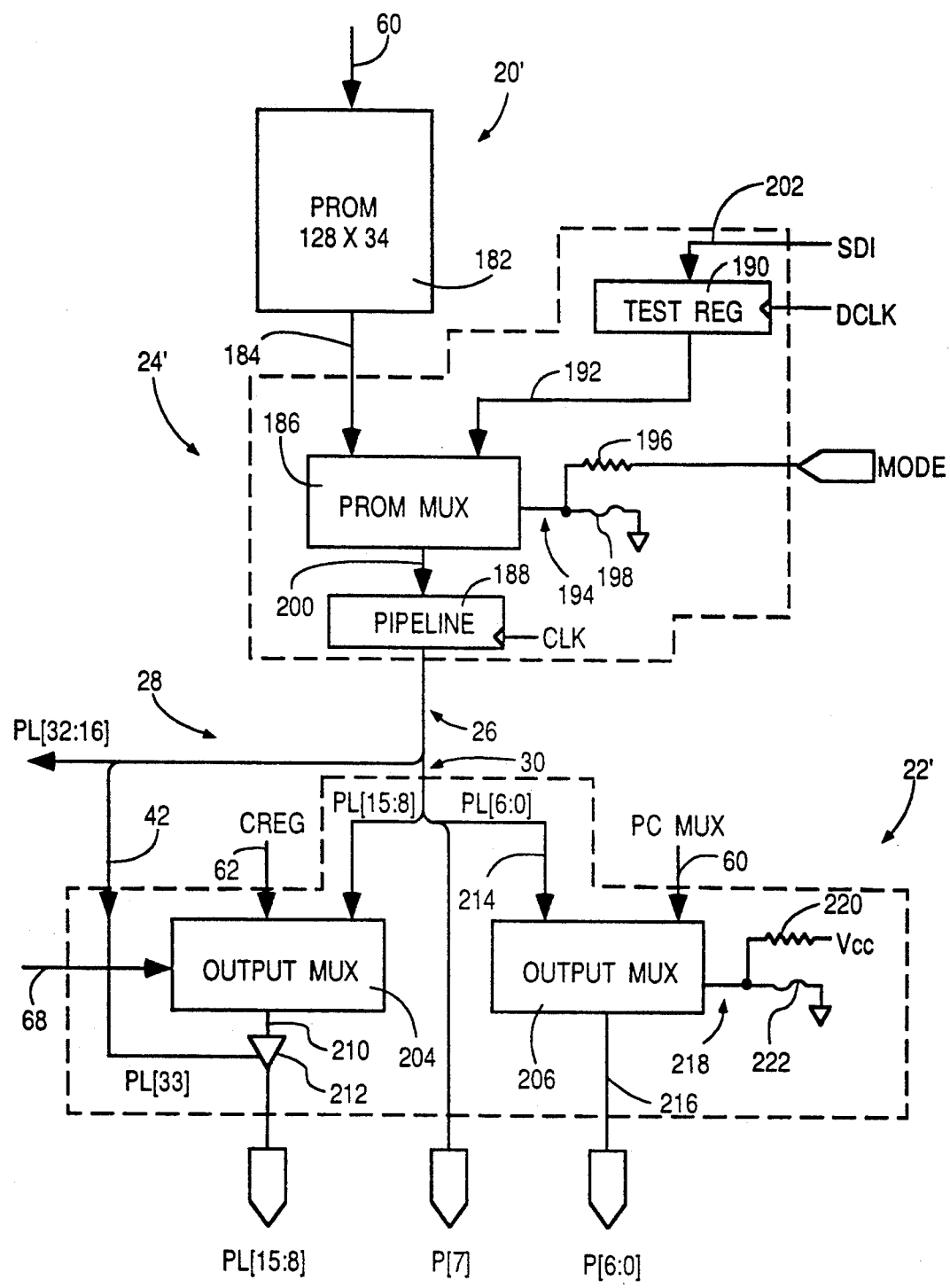
FIG. 8 is a block diagram of a microprogram memory, a pipeline register circuit, and an output buffer for a first PROM embodiment of the present invention.

Referring now to FIG. 8, a preferred embodiment for a microprogram memory 20', pipeline register circuit 24', and output buffer 22' are shown. Microprogram memory 20' preferably includes a programmable read only memory (PROM) 182 which is addressed by the address generator bus 60, and which develops a thirty-four-bit-wide output on a bus 184. PROM 182 can be programmed by techniques well known to those skilled in the art.

Pipeline register output 24 includes a PROM multiplexer (MUX) 186, a thirty-four-bit-wide pipeline register 188, and a thirty-four-bit-wide test register 190. PROM MUX 186 is a thirty-four-bit-wide, 2-to-1 multiplexer responsive to bus 184 and to a thirty-four-bit-wide bus 192 from test register 190. PROM MUX 186 has a control input 194 which is coupled to a mode control pin MODE by a resistor 196 and to ground by a fuse 198. A user can selectively blow fuse 198 or leave it intact, to enable or disable the MODE pin.

Test register 190 is a serial-to-parallel serial shift register having a serial input line 202 and a parallel output coupled to bus 192. Register 190 is externally clocked by a diagnostic clock (DCLK)

Output buffer 22' includes a first output multiplexer (MUX) 204 and a second output multiplexer (MUX) 206. Both output multiplexers 204 and 206 are eight-bit-wide, 2-to-1 multiplexers.

Output MUX 204 has, as inputs, loop counter bus 62 and a bus 208 derived from the upper eight bits of control bus 30. Output MUX 204 has an output bus 210 which is coupled to output pins P[15:8] by tri-state buffers 212. The tri-state buffers 212 are enabled or disabled by output enable line 42 derived from line PL[33].

Output MUX 204 is controlled by multiplexer control line 68 from the microinstruction decoder 18. Output multiplexer 204 can therefore be dynamically controlled by microinstructions stored within microprogram memory 20 and as a result of test conditions input on T[6:0] and CC.

Output MUX 206 has inputs coupled to a bus 214, which is derived from the lower 7 bits of control bus 30, and bus 60 from the PCMUX. Output MUX 206 has an output on a bus 216 which is coupled to outputs P[6:0].

Output MUX 206 has a control input 218 coupled to $V_{cc}$ by a resistor 220, and to ground by a fuse 222. When fuse 222 is blown, control input 218 is HI and when fuse 222 is intact control input 218 is LO. The fuse 222 can be programmed (blown) by techniques well known to those skilled in the art.

By blowing or not blowing fuse 222, output MUX 206 can route the signals on either bus 214 or bus 60 to the output pins P[6:0]. When the address generator bus 60 is routed to pins P[6:0] the programmable controller 10 can be operated in its expansion mode as was discussed in greater detail with reference to FIG. 4.

Figure 9:
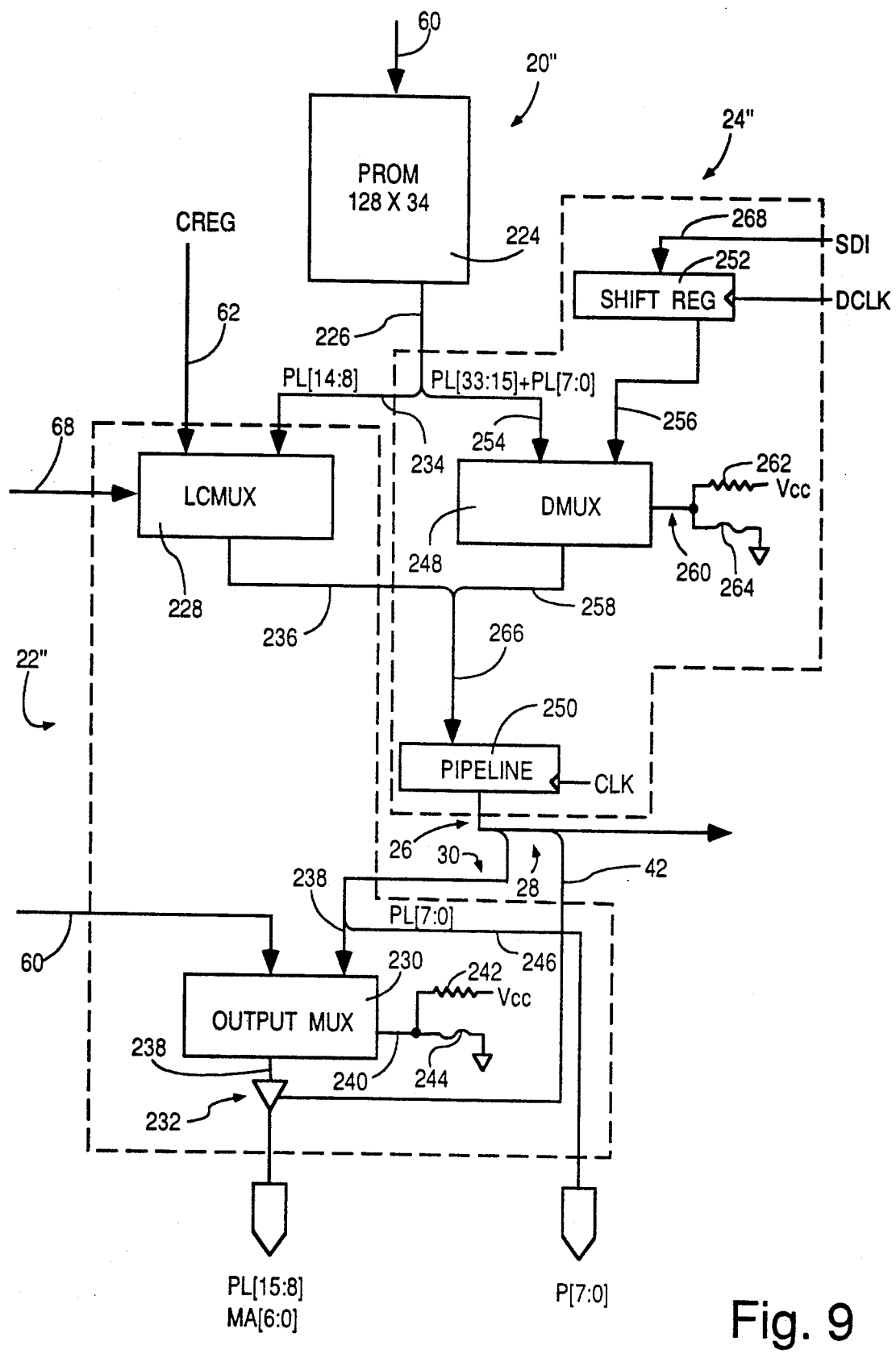
FIG. 9 is a block diagram of a microprogram memory, a pipeline register circuit, and an output buffer for a second PROM embodiment of the present invention.

Referring now to FIG. 9, an alternate embodiment for the microprogram memory, pipeline, and output buffer are shown. More specifically, a microprogram memory 20'' includes a programmable read-only memory (PROM) 224 which is preferably thirty-four bits wide and 128 words deep. The PROM is addressed by address generator bus 60, and develops a thirty-four-bit-wide output on a bus 226. PROM 224 can be programmed by techniques well known to those skilled in the art.

Output buffer 22'' includes a loop counter multiplexer (LCMUX) 228, an output multiplexer (MUX) 230, and a tri-state buffer 232. LCMUX 228 is a seven bit-wide, 2-to-1 multiplexer having, as inputs, bus 62 from loop counter 58 and a bus 234 corresponding to bus lines PL[14:8], and an output on a seven-bit-wide bus 236. LCMUX 228 is controlled by multiplexer control line 68 from the microinstruction decoder 18.

Output MUX 230 is an eight-bit-wide, 2-to-1 multiplexer having, as inputs, the address generator bus 60 and a bus 238 derived from control bus 30. Output MUX 230 has an eight-bit-wide output bus 238, and is controlled by a control input 240 which is coupled to $V_{cc}$ by a resistor 242 and to ground by a fuse 244 to permit fuse programming of the multiplexer.

Bus 238 is coupled to the input of tri-state buffer 232, which is controlled by output enable line 42. A bus 246 corresponding to lines PL[7:0] is coupled to output pins P[7:0].

Pipeline circuitry 24'' includes a diagnostics multiplexer (DMUX) 248, a pipeline register 250, and a serial-to-parallel serial shift register 252. DMUX 248 is a twenty-seven-bit-wide, 2-to-1 multiplexer having, as inputs, a bus 254 derived from bus 226, and a bus 256 derived from serial shift register 252.

DMUX 248 has an output on a bus 258 which is merged with bus 236 for input to pipeline register 250.

DMUX 248 has a control input 260 which is coupled to $V_{cc}$ by a resistor 262 and to ground by a fuse 264 to permit fuse programming.

Pipeline register 250 is a thirty-four-bit-wide D-type register which is clocked by system clock CLK. The pipeline register 250 has as an input coupled to a bus 266, and has an output on pipeline bus 26.

Serial shift register 252 is coupled to an input line 268 for serial data input (SDI), and has a twenty-seven-bit-wide output coupled to bus 256. Serial shift register 252 is clocked by an external diagnostic clock (DCLK).

Pipeline register 250 is a thirty-four-bit-wide D-type register having an input coupled to bus 266, and having an output coupled to pipeline bus 26. Pipeline register 250 is clocked by the system clock CLK.

PROM Microinstructions

The PROM embodiments of the present invention have twenty-six microinstructions to permit such processes as conditional branching, conditional subroutine calls, loop counting, etc. The microinstruction set is detailed below:

| OP-CODE | MNE-MONIC | REGISTER TRANSFER NOTATION AND DESCRIPTION |
|---|---|---|
| 00 | PUSH | if (cond = true) then<br>  TOS = TOS + 1;<br>  stack (TOS) = PC + 1;<br>  PC = PC + 1;<br>else<br>  PC = PC + 1;<br>Conditionally push PC + 1 into the SREG. |
| 01 | PUSHLDPL | if (cond = true) then<br>  TOS = TOS + 1;<br>  stack (TOS) = PC + 1;<br>  CREG = PL (data);<br>  PC = PC + 1;<br>else<br>  PC = PC + 1;<br>Conditionally push PC + 1 into the SREG and load the CREG from the PL (DATA[6:0]). |
| 02 | PUSHLDTM | if (cond = true) then<br>  TOS = TOS + 1;<br>  stack (TOS) = PC + 1;<br>  CREG = T*$_{M(data)}$;<br>  PC = PC + 1;<br>else<br>  PC = PC + 1;<br>Conditionally push PC + 1 into the SREG and load the CREG from the T*$_M$ (T[6:0]) under bitwise mask from DATA([6:0]). |
| 03 | PUSHCNTR | if (cond = true) the<br>  TOS = TOS + 1;<br>  stack (TOS) = CREG;<br>  PC = PC + 1;<br>else<br>  PC = PC + 1;<br>Conditionally push the contents of CREG into the SREG. |
| 04 | POP | if (cond = true) then<br>  TOS = TOS - 1;<br>  PC = PC + 1;<br>else<br>  PC = PC + 1;<br>Conditionally pop data from the SREG. |
| 05 | POPCNTR | if (cond = true) then<br>  CREG = stack (TOS);<br>  TOS = TOS - 1;<br>  PC = PC + 1;<br>else<br>  PC = PC + 1;<br>Conditionally pop data from the SREG and store in the CREG. |
| 06 | CALLPL | if (cond = true) then<br>  TOS = TOS + 1;<br>  stack (TOS) = PC + 1;<br>  PC = PL(data);<br>else<br>  PC = PC + 1;<br>Conditional jump to subroutine at the address in the PL (DATA[6:0]). The PC + 1 is pushed into the SREG as the return address. |
| 07 | CALLTM | if (cond = true) then<br>  TOS = TOS + 1;<br>  stack (TOS) = PC + 1;<br>  PC = T*$_{M(data)}$;<br>else<br>  PC = PC + 1;<br>Conditional jump to subroutine at the address specified by the T*$_M$ (T[6:0]) under bitwise mask from DATA [6:0]. The PC + 1 is pushed into the SREG as the return address. |
| 08 | RET | if (cond = true) then<br>  PC = stack (TOS);<br>  TOS = TOS - 1;<br>else<br>  PC = PC + 1;<br>Conditional return from nested subroutine. |
| 09 | RET/LOAD | if (cond = true) then<br>  PC = stack (TOS);<br>  TOS = TOS - 1;<br>  CREG = PL(data);<br>else<br>  PC = PC + 1;<br>Conditional return from subroutine. The Creg is loaded from PL (DATA[6:0]). |
| 0A | LOADPL | if (cond = true) then<br>  CREG = PL(data);<br>  PC = PC + 1;<br>else.<br>  PC = PC + 1;<br>Conditional load the CREG from the PL (DATA [6:0]). |
| 0B | LOADTM | if (cond = true) then<br>  CREG = T*$_{M(data)}$;<br>  PC = PC + 1;<br>else<br>  PC = PC + 1;<br>Conditional load the CREG from the T*$_M$ (T[6:0]) inputs under bitwise mask from DATA ([6:0]). |
| 0C | FORK | if (cond = true) then<br>  PC = PL (data);<br>else<br>  PC = stack (TOS);<br>Conditional branch to the address in the PL (DATA[6:0]) or the SREG. A branch to PL is taken if the condition is true and a branch to SREG if false. |
| 0D | DEC | if (cond = true) then<br>  CREG = CREG - 1;<br>  PC = PC + 1;<br>else<br>  PC = PC + 1;<br>Conditional decrement of the CREG. |
| 0E | CNTHLDPL | if (CREG <> 0) & (cond = true)<br>  PC = PL (data);<br>else<br>  if (CREG <> 0) &<br>  (cond <> true) then<br>    CREG = CREG - 1;<br>    PC = PC;<br>  else<br>    if (CREG = 0) then<br>      PC = PC + 1;<br>Conditional Hold/Count. The current microinstruction will be refetched and the CREG decremented until the |

| OP-CODE | MNEMONIC | REGISTER TRANSFER NOTATION AND DESCRIPTION |
|---|---|---|
| | | condition under test becomes true or the counter beoomes equal to zero. If the condition becomes true, a branch to the address in the PL (DATA[6:0]) is executed. If the counter becomes zero without the condition becoming true, a CONTINUE is executed. |
| 0F | CNTLDPL | if (CREG <> 0) then<br>   CREG = CREG − 1;<br>   PC = PC;<br>else<br>   CREG = PL (data);<br>   PC = PC + 1;<br>Conditional Hold until the contents of CREG is equal to zero, then load CREG from the PL (DATA[6:0]). This microinstruction is intended for timing waveform generation. If the CREG is not equal to zero, the same microinstruction is refetched while the CREG is decremented. Timing is complete when the CREG is equal to zero, causing the next microinstruction to be fetched and the CREG to be reloaded frnom PL. |
| 10 | CNTLDTM | if (CREG <> 0) then<br>   CREG = CREG − 1<br>   PC = PC;<br>else<br>   CREG = $T^*_{M(data)}$;<br>   PC = PC + 1;<br>Conditional Hold until the CREG is equal to zero, then load CREG from the $T^*_M$ (T[6:0]) under bitwise mask from DATA[6:0]). This microinstruction is also intended for timing waveform generation. If the CREG is not equal to zero, the same microinstruction is refetched while the CREG is decremented. Timing is complete when the CREG is equal to zero, causing the next microinstruction to be fetched and the CREG to be reloaded from $T^*_M$. |
| 11 | GOTO PL | if (cond = true) then<br>   PC = PL (data)<br>else<br>   PC = PC + 1;<br>Conditional branch to the address in the PL (DATA[6:0]). |
| 12 | LOOP PL | if (CREG <> 0) then<br>   CREG = CREG − 1;<br>   PC = PL (data);<br>else<br>   PC = PC + 1;<br>Conditional loop to the address in the PL (DATA[6:0]). This microinstruction is intended to be placed at the bottom of an iterative loop. If the CREG is not equal to zero, the CREG is decremented (signifying completion of an iteration), and a branch to the top of the loop at PL is executed. If the CREG is equal to zero, looping is complete and the next sequential microinstruction is executed. |
| 13 | GOTO TM | if (cond = true) then<br>   PC = $T^*_{M(data)}$;<br>else<br>   PC = PC + 1;<br>Conditional branch to the address defined by the $T^*_M$ (T[6:0]) under bitwise mask from DATA [6:0]). This microinstruction is intended for multiway branches. |
| 14 | LOOP TM | if (CREG <> 0) then<br>   CREG = CREG − 1;<br>   PC = $T^*_{M(data)}$; |
| | | else<br>   PC = PC + 1;<br>Conditional loop to the address defined by the $T^*_M$ (T[6:0]) under bitwise mask from from DATA([6:0]) |
| 15 | GOTOSTCK | if (cond = true),then<br>   PC = stack (TOS);<br>else<br>   PC = PC + 1;<br>Conditional jump to the memory location stored at the top of the STACK. |
| 16 | LOOPSTCK | if (CREG <> 0) then<br>   CREG = CREG − 1;<br>   PC = stack (TOS);<br>else<br>   TOS = TOS − 1;<br>   PC = PC + 1;<br>Conditional loop. If CREG equals zero, the CREG is decremented and PC REG is loaded with the address stored at the top of the stack. Otherwise, the TOS is decremented. |
| 17 | HOLDPL | if (cond = true) then<br>   PC = PL (data);<br>else<br>   PC = PC;<br>Conditional Hold. The current microinstruction will be refetched and executed until the condition under test becomes true. When true, a branch to the address in, the PL (DATA[6:0]) is executed. |
| 18 | HOLDTM | if (cond = true) then<br>   PC = $T^*_{M(data)}$;<br>else<br>   PC = PC;<br>Conditional hold similar to HOLDPL except the branch address is defined by $T^*_M$ (T[6:0]) under bitwise mask from DATA([6:0]). |
| 19 | GOTOPLZ | if (CREG <> 0) then<br>   PC = PC + 1;<br>else<br>   PC = PL (data);<br>Conditional branch. when the COUNTER is equal to zero, to the address in the PL (DATA[6:0]). |
| 1A | CONT | if (STACKFULL) then<br>   TOS = reset;<br>   PC = PC + 1;<br>if (cond = EQ) then<br>   EQ = reset;<br>   PC = PC + 1;<br>else<br>   PC = PC + 1;<br>If the stack is full, it is reset. If the test field selects EQ, the EQ flag is reset. |
| 1B | OUTPUT | if (cond = true) then<br>   output (CREG);<br>   PC = PC + 1;<br>else<br>   PC = PC + 1;<br>If the test field is set to true, the contents of the CREG is output. |
| 1C to 1F | CMP | EQ = COMPARE CONSTANT with $T^*_{M(data)}$;<br>Set the EQ flag when the constant equals $T^*_M$ (T[6:0]) under bitwise mask from DATA ([6:0]). |

RAM EMBODIMENT

The RAM embodiment of the present invention has many points of similarity to the PROM embodiments described previously, with the exception that the microprogram memory is RAM based rather than ROM based. When the microprogram memory 20 of FIG. 1 is RAM based, additional circuitry must be required to effectively and efficiently load instructions into the microprogram memory. Such circuitry will be discussed in greater detail subsequently.

RAM Pin Descriptions

Figure 10:
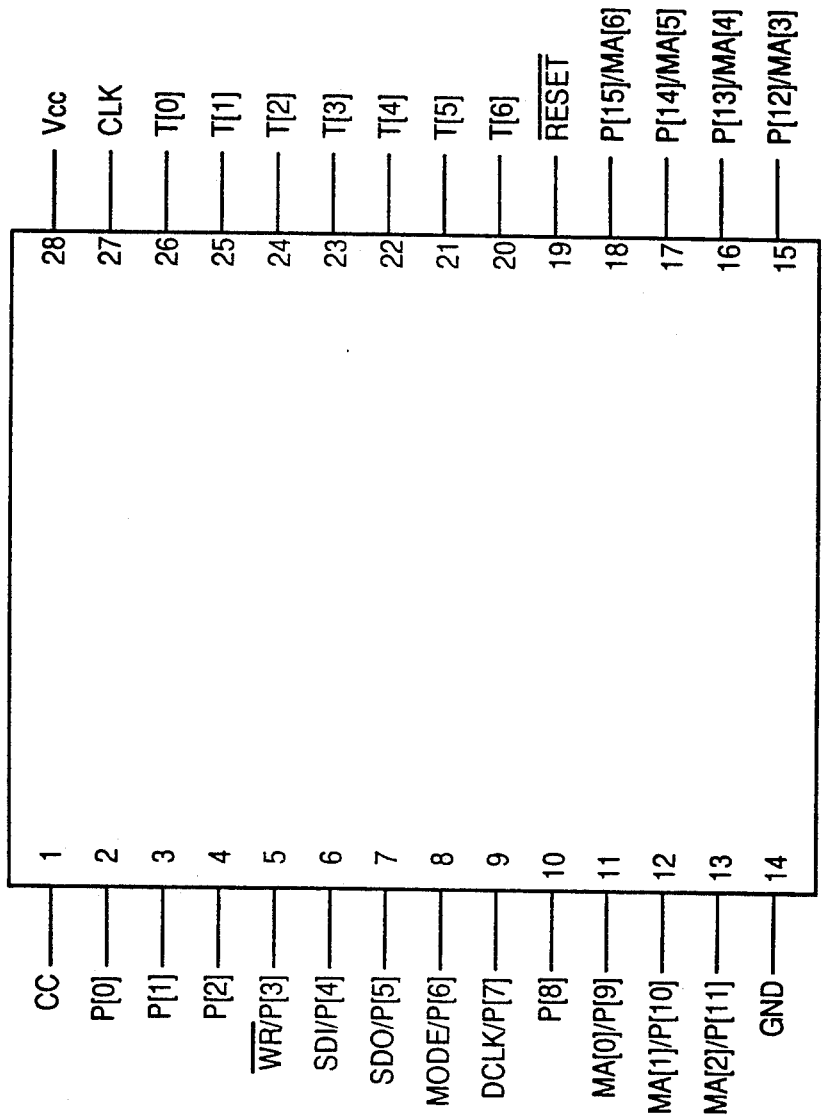
FIG. 10 is a pin diagram for a RAM embodiment of the present invention.

Referring now to FIG. 10, the pin description for the RAM embodiment of the present invention are as follows:

| Pin Number | Pin Mnemonic | Description |
|---|---|---|
| 1 | CC | External condition (CC) test input. The CC input can be fused programmed as registered or transparent. |
| 2-9 | P[0:7] | The lower, general purpose microprogrammed control outputs. Outputs P[7:0] are permanently enabled. |
| 5 | /WR | Write strobe. |
| 6 | SDI | Serial data input when in a serial shadow register (SSR) diagnostics mode. |
| 7 | SDO | Serial data output when in a serial shadow register (SSR) diagnostics mode. |
| 8 | MODE | Diagnostic control mode input when in a serial shadow register (SSR) diagnostics mode. |
| 9 | DCLK | Diagnostic clock input when in the serial shadow register mode. |
| 10-13 and 15-18 | P[8:15] | Upper, general purpose microprogrammed control outputs which can be selectively and dynamically enabled. When not enabled, the P[15:8] outputs are tri-stated. Also, the contents of an internal counter/register can be routed to the control outputs P[14:8] under microinstruction control, permitting dynamic modification of control outputs. |
| 10-13 and 15-17 | MA[0:6] | Microprogram address outputs from the internal program counter. A controller expandable option EXP can be programmed to set pins 10-13 and 15-17 to output the microprogram address for external memory devices. |
| 14 | GND | Ground. |
| 19 | /RESET | Reset. A reset forces the program counter to "1111111". |
| 20-26 | T[6:0] | External test inputs. In conditional microinstructions these inputs are selected according to a four bit test subfield. The inputs T[6:0] can also be used either as a branch address or as a count value depending upon the microinstruction. The inputs T[6:0] can be fuse programmed as registered or as transparent. |
| 27 | CLK | Clock input. The rising edge of the clock is used to trigger internal registers. |
| 28 | $V_{cc}$ | Power input. |

RAM Circuitry

Figure 11:
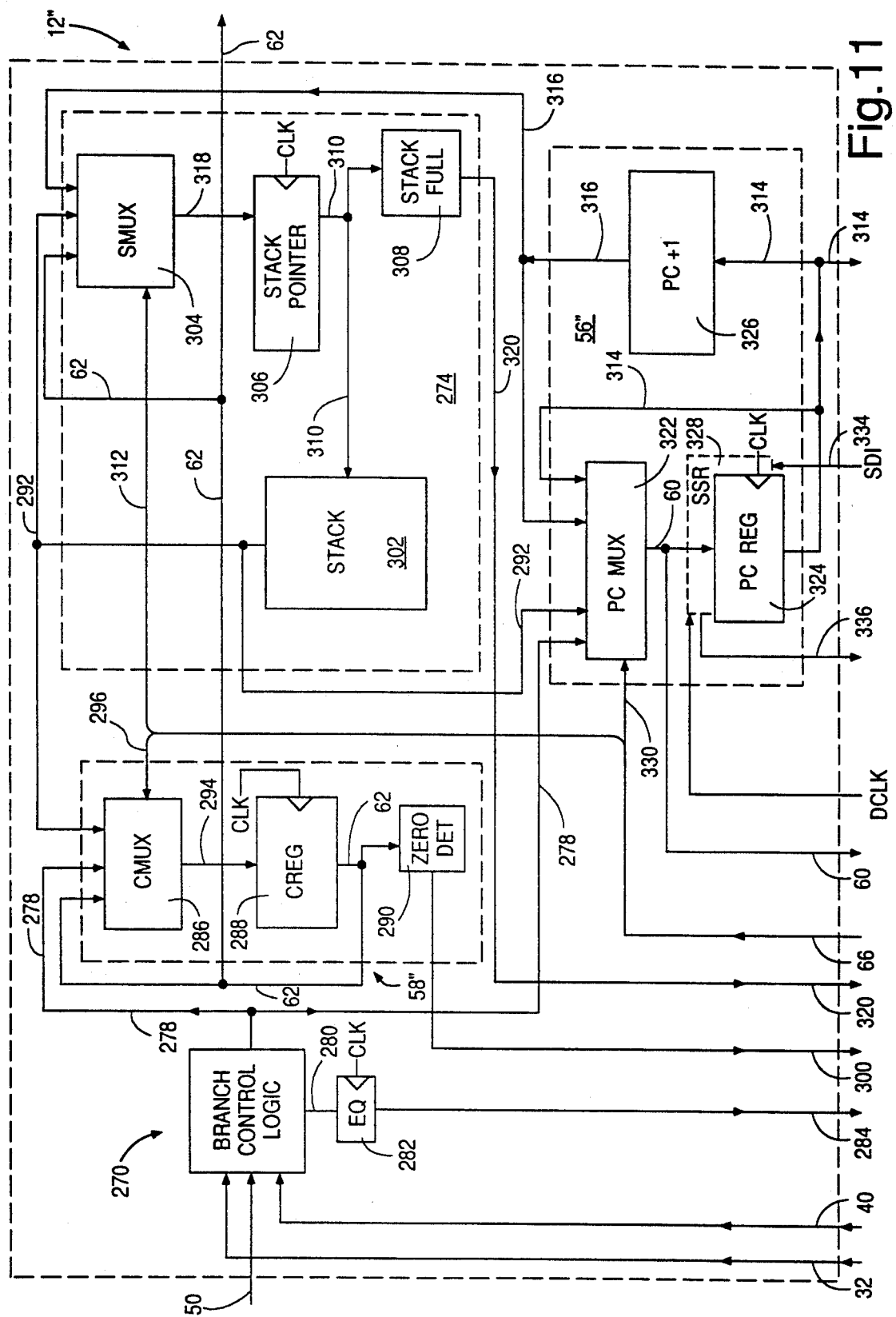
FIG. 11 is a block diagram of a microaddress control logic for the RAM embodiment.

In FIG. 11, a microaddress control logic 12″ particularly adapted for a RAM based microprogram memory includes branch control logic 270, loop counter circuitry 58″, stack circuitry 274, and address generator circuitry 56″.

Branch control logic 270 is responsive to data bus 32, constant bus 40, and test input 50. Branch control logic produces branch control signals on a bus 278 which is input into loop counter 58″ and address generator circuitry 56″. Branch control logic 270 also develops an output on a line 280 which is clocked into an equality (EQ) flip-flop 282 by the system clock CLK. The output of EQ flip-flop 282 is developed on a line 284.

Loop counter 58″ includes a counter multiplexer (CMUX) 286, a counter register (CREG) 288, and a zero detection circuit 290. CMUX 286 is a seven-bit-wide, 3-to-1 multiplexer having, as inputs, bus 278, bus 62, and a bus 292 from stack circuitry 274. CMUX 286 develops a seven-bit-wide output on a bus 294, and is controlled by a control bus 296 derived from sequencing bus 66.

CREG 288 has, as an input, bus 294 from CMUX 286, and develops a seven-bit-wide output on bus 62. CREG 288 is clocked by the system clock CLK. Zero detection circuit 290 is responsive to the signals on bus 62, and develops an output signal on a line 300 indicative of whether the loop count in CREG 288 is zero.

Stack circuitry 274 includes a stack 302, a stack multiplexer (SMUX) 304, a stack pointer register 306, and a stack-full circuit 308. The stack 302 is preferably a four word, seven-bit-wide stack permitting multiple nested subroutine calls, and is responsive to a pointer bus 310 developed by stack pointer register 306. Stack 302 develops an address output on bus 292.

SMUX 304 is a seven-bit-wide, 3-to-1 multiplexer controlled by a control bus 312 which is derived from sequencing bus 66. SMUX 304 has, as inputs, counter bus 62, a bus 316, and bus 292 from the stack 302. SMUX 304 has an output on a bus 318.

Stack pointer 306 is a seven-bit-wide register clocked by the system clock CLK. Stack pointer register 306 develops an output on pointer bus 310 which, in addition to being coupled to an input of stack 302, is further coupled to an input of stack-full circuit 308. Stack-full circuit 308 develops a stack-full signal on a line 320 when the pointer address on bus 310 has reached the top of the stack.

Address generator circuitry 56″ includes a program counter multiplexer (PC MUX) 322, a program counter (PC) register 324, an incrementer 326, and a serial shadow register (SSR) 328 (shown in broken lines). PC MUX 322 is controlled by a control bus 330 derived from sequencing bus 66, and is a 4-to-1, seven-bit-wide multiplexer. The inputs to PC MUX 322 include bus 278 from branch control logic 270, bus 292 from stack 302, bus 316, and bus 314. PC MUX 322 develops an output on address generator bus 60.

PC register 324 is a seven-bit-wide register clocked by system clock CLK. The input to PC register 324 is coupled to bus 60, and PC register 324 develops an output on bus 314. Incrementer 326 is responsive to the program count on bus 314, and develops an incremented program count on bus 316.

Serial shadow register 328 is a seven-bit-wide, serial-to-parallel shift register used to load data into PC register 324. The operation of serial shadow registers is discussed in greater detail in the related, copending application that was referenced above. Briefly, the serial shadow register 328 is clocked by an externally provided diagnostic clock DCLK, to load serial data input (SDI) from a line 334 into seven-bit-wide PC register 324. The serial shadow register 328 also provides an address on a bus 336 for purposes to be discussed subsequently.

Figure 12:
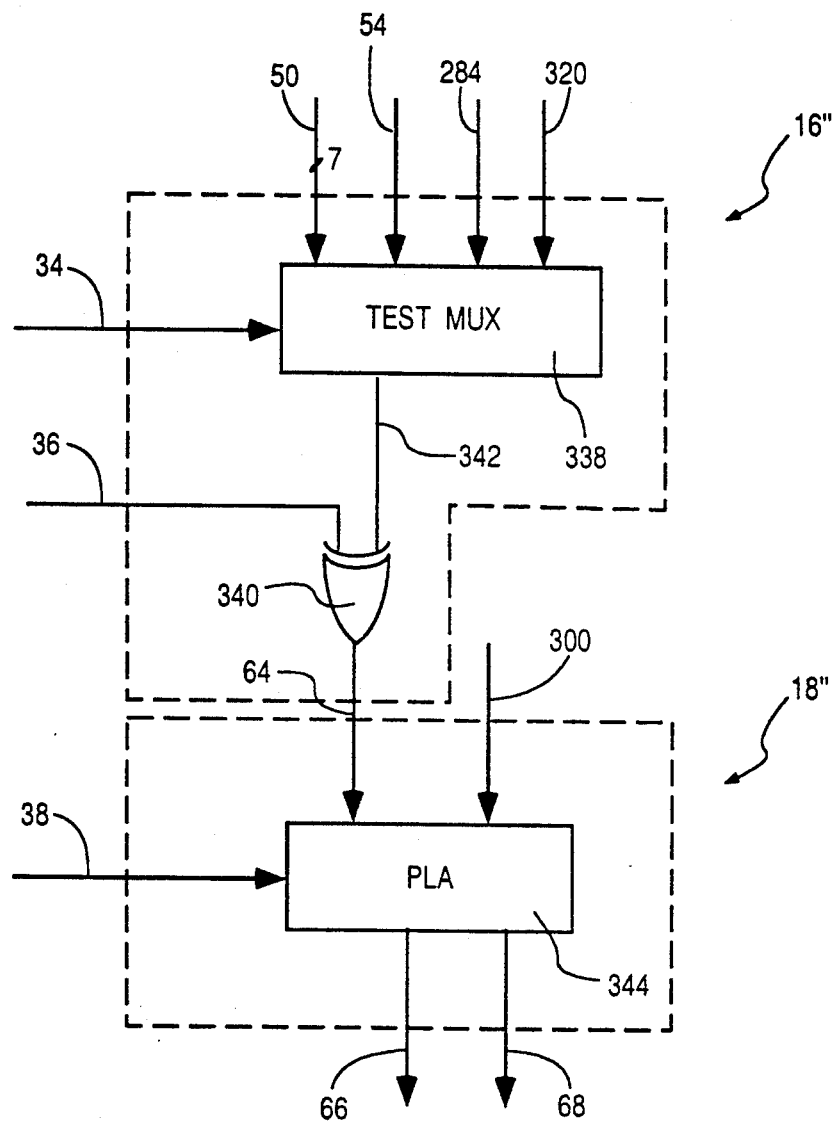
FIG. 12 is a block diagram of a test logic and a microinstruction decoder for the RAM embodiment.

In FIG. 12. a test logic circuit 16" and a microinstruction decoder circuit 18" for use with the RAM embodiment of the present invention are shown. Test logic 16" includes a TEST multiplexer (MUX) 338 and an exclusive (XOR) gate 340. TESTMUX 338 is controlled by test bus 34 and has, as inputs, bus 50, line 54, line 284, and line 320. The selected output of TEST MUX 338 is developed on a line 342.

XOR gate 340 has a first input coupled to polarity (POL) line 36, and a second input coupled to line 342 of test MUX 338. The output of XOR gate 340 is developed on line 64, which is input to microinstruction decoder 18". Test logic circuit 16" operates in substantially the same manner as test logic circuit 16' of FIG. 7.

Microinstruction decoder 18" includes a program logic array (PLA) 344 having, as inputs, OPCODE bus 38, line 64 from test logic circuitry 16", and line 300 from the zero detection circuit 290 of microaddress control logic 12". PLA 344 develops outputs on sequencing bus 66 and multiplexer control line 68.

Figure 13:
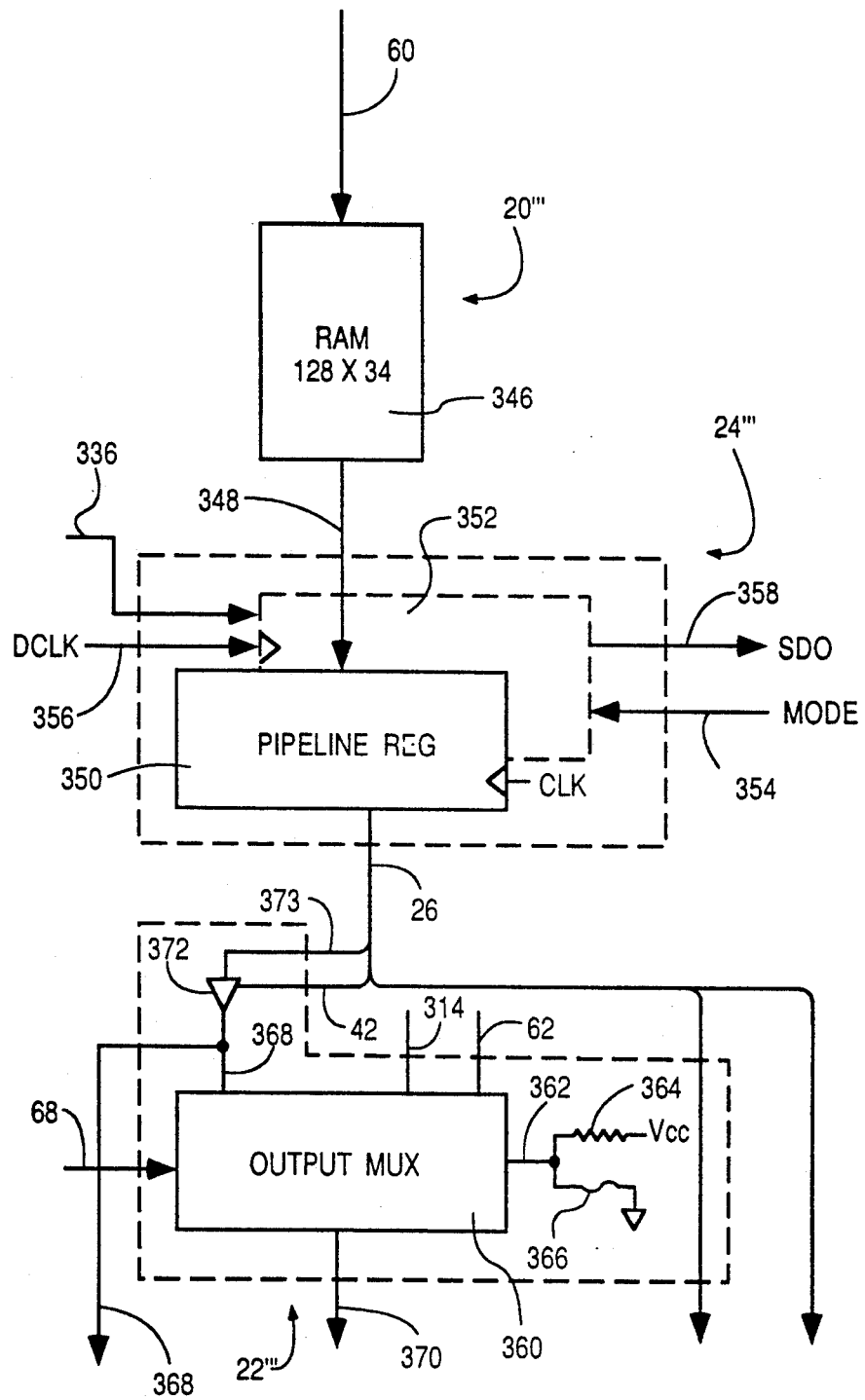
FIG. 13 is a block diagram of a microprogram memory, a pipeline register circuit, and an output buffer for the RAM embodiment.

Referring now to FIG. 13, a microprogram memory 20''', a pipeline 24''', and an output buffer 22''' will be discussed in greater detail. Microprogram memory 20''' is preferably a thirty-four-bit-wide RAM 346 having 128 words of storage. RAM 346 is addressed by address generator bus 60, and develops an output on a thirty-four-bit-wide data bus 348. Pipeline register circuit 24''' includes a pipeline register 350 and a serial shadow register (SSR) 352. Pipeline register 350 is a thirty-four-bit-wide register having bus 348 coupled to its input and pipeline bus 26 coupled to its output. Pipeline register 350 is clocked by system clock CLK.

Serial shadow register (SSR) 352 includes a thirty-four-bit-wide register having inputs coupled to bus 336 from PC register 324, and to a mode line 354. SSR 352 is clocked by external diagnostic clock (DCLK) via a line 356, and can output serial data on a line 358. Alternatively, SSR 352 can load data, in parallel, into pipeline register 350.

Output buffer 22''' includes an output multiplexer (MUX) 360 which is controlled by a status bit. Output MUX 360 is a seven-bit-wide, 3-to-1 multiplexer, and has inputs coupled to a bus 368, bus 314, and bus 62. Output MUX 360 has outputs coupled to a seven-bit bus 370.

Output buffer 22''' further includes a tri-state buffer 372 coupled to a bus 373 derived from pipeline bus 26, and having an output on bus 368. Tri-state buffer 372 is controlled by output enable line 42.

Figure 14:
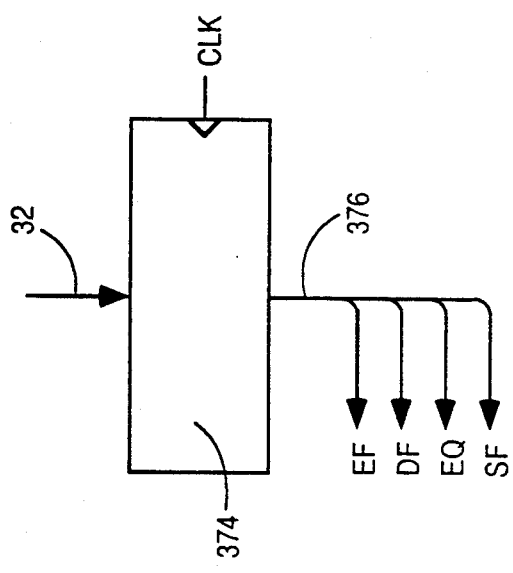
FIG. 14 is a block diagram of the status word register.

With reference to FIG. 14, the RAM embodiment of the programmable controller 10 further includes a status word register 374. Status word register 374 is clocked by the system clock CLK, and has inputs coupled to the lowest two bit lines of data bus 32. Status word register 374 has an output on a status bus 376.

Figure 15:
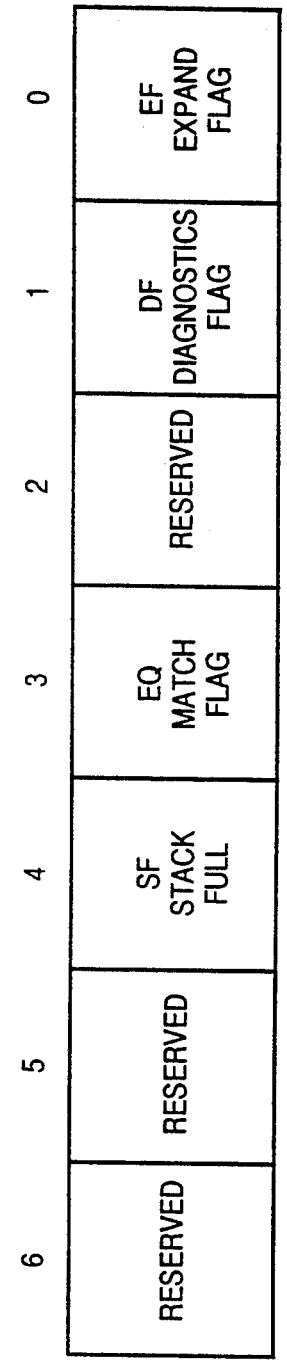
FIG. 15 illustrates the fields of the status word stored within the status word register shown in FIG. 14.

Referring now to FIG. 15, the seven-bit status word includes three reserved bits (6, 5, and 2) and three flag bits. Bit four of the status word is the stack full (SF) bit, bit three of the status word is the match flag (EQ), bit one of the status word is the diagnostics flag (DF), and bit zero of the status word is the expand flag (EF). The use of the flags are described in the table below:

| BIT FUNCTION | NAME | FUNCTION |
| --- | --- | --- |
| 0 | EF | Expand Flag - When set, the contents of program counter (PC) will be output via pins P[14:8] to address external control store. |
| 1 | DF | Diagnostics Flag - Once set, the SSR diagnostics mode is selected. |
| 3 | EQ | EQ Flag is set if a match occurs during comparison; it is cleared if there is any conditional branch on the EQ flag. |
| 4 | SF | Stack Full Flag - Set if stack overflows; cleared otherwise. |

It should be noted that only the DF and EF flags can be changed via software instructions. The EQ and SF flags are set by hardware.

When the diagnostics flag (DF) is set, the serial shadow register (SSR) diagnostics mode is selected. In this mode, pin P[4] becomes a serial data input (SDI), pin P[5] becomes a serial data output (SDO), pin P[6] becomes a mode control input (MODE), and pin P[7] becomes a diagnostic clock (DCLK). When in the diagnostic mode, thirty-four-bit-wide SSR 352 and seven-bit-wide SSR 328 become activated. The SSR registers 352/328 can be serially loaded from the SDI pin, parallel loaded from the pipeline register 350, or held. Also, the pipeline register 350 can be loaded from SSR 352 for diagnostic purposes.

RAM 346 may be initialized following a system powerup, or prior to starting a new sequence of microinstructions. During the initialization, microinstructions are serially loaded into SSR 328. Once the /WR strobe is asserted, a microinstruction that has been serially loaded into SSR 352 is written into the RAM 346 at the address specified by the contents of SSR 328.

The initialization of the contents of RAM 346 is commenced by asserting the reset input to the programmable controller 10. Once reset is asserted, pin P[3] becomes write strobe (/WR), pin P[4] becomes serial data input (SDI), pin P[6] becomes mode control (MODE), and pin P[7] becomes diagnostic clock (DCLK).

RAM Microinstructions

The instruction set for the RAM embodiment of programmable controller 10 is the same as the instruction set for the PROM embodiments with the exception of OPCODE 15H where the GOTOSTCK instruction of the PROM embodiments has been replaced by the SETMODE instruction in the RAM embodiment. The SETMODE instruction is as follows:

| opcode | mnemonic | operation |
| --- | --- | --- |
| 15 | SETMODE | Unconditionally set operating mode. The 2 least significant bits of data field will be loaded into the 2 least significant bits (DF and EF flags) of status word. |

The foregoing description of the preferred embodiments of the present invention has been presented for purposes of illustration and description. It is not intended to be exhaustive or to limit the invention to the precise forms disclosed. Obviously, many modifications and variations will be apparent to practitioners skilled in this art. It is possible that the invention may be practiced in many technologies including CMOS and bipolar. Memory technologies including RAM, EPROM, EEPROM, etc. can be equally well implemented in various embodiments of this invention. Similarly, any process steps described might be interchangeable with other steps in order to achieve the same result. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the claims appended hereto and their equivalents.

What is claimed is:

1. In a programmable controller including microaddress control logic, a memory, and microinstruction decoder logic; an improved microaddress control logic circuit comprising:
    a branch control logic responsive to at least a portion of an internal field of a microinstruction word, said branch control logic being operative to develop branch control signals;
    a loop counter coupled to said branch control logic and responsive to a number of said branch control signals, said loop counter being operative to develop a loop count signal;
    a program counter coupled to said branch control logic and responsive to a number of said branch control signals, said program counter being operative to develop a program count signal; and
    stack means coupled to said loop counter and said program counter for selectively storing outputs thereof, said stack means being operative to develop a stack output signal,
    wherein said stack means includes a stack multiplexer, a stack pointer coupled to outputs of said stack multiplexer, and stack memory addressed by said stack pointer.

2. A microaddress control logic circuit as recited in claim 1 wherein said loop counter includes a counter multiplexer having inputs coupled to a number of said branch control signals; and a counter register coupled to outputs of said loop counter multiplexer, said counter register developing said loop count signal.

3. A microaddress control logic circuit as recited in claim 2 wherein said loop counter further includes a decrementer coupled to said counter register for developing a decremented count signal from said loop count signal, where said decremented count signal is coupled to inputs of said counter multiplexer.

4. A microaddress control logic circuit as recited in claim 2 further comprising a zero detector responsive to said loop count signal and operative to develop a zero detection signal therefrom.

5. A microaddress control logic circuit as recited in claim 2 wherein said counter multiplexer has inputs coupled to said stack means.

6. A microaddress control logic circuit as recited in claim 1 wherein said program counter includes a program counter multiplexer, a program counter register coupled to outputs of said program counter multiplexer for developing said program count signal, and an incrementer coupled to said program counter register and operative to develop an incremented program counter signal from said program counter signal.

7. A microaddress control logic circuit as recited in claim 6 wherein said program counter multiplexer has inputs coupled to said branch control logic, said stack means, said program counter register, and said incrementer.

8. A microaddress control logic circuit as recited in claim 1, wherein said stack means is further coupled to said branch control logic and is responsive to at least one of said branch control signals.

9. A microaddress control logic circuit as recited in claim 1 wherein said stack multiplexer has inputs coupled to said branch control logic, said program counter, and to said loop counter.

* * * * *

UNITED STATES PATENT AND TRADEMARK OFFICE
CERTIFICATE OF CORRECTION

PATENT NO.   : 5,261,116
DATED        : November 9, 1993
INVENTOR(S)  : Om P. Agrawal It is certified that error appears in the above-identified patent and that said Letters Patent is hereby corrected as shown below:

Col. 19, line 39, delete "coupled to outputs of" and insert --for receiving data outputted from--.

Signed and Sealed this

Seventeenth Day of May, 1994

*Attest:*

BRUCE LEHMAN

*Attesting Officer*     Commissioner of Patents and Trademarks